US008717583B2

(12) United States Patent
Igarashi

(10) Patent No.: US 8,717,583 B2
(45) Date of Patent: May 6, 2014

(54) PRINTING APPARATUS FOR INSERTING AT LEAST ONE TAB SHEET, METHOD OF CONTROLLING THE PRINTING APPARATUS, AND RECORDING MEDIUM

(75) Inventor: Hiroya Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1158 days.

(21) Appl. No.: 12/417,265

(22) Filed: Apr. 2, 2009

(65) Prior Publication Data

US 2009/0251716 A1 Oct. 8, 2009

(30) Foreign Application Priority Data

Apr. 4, 2008 (JP) ................................. 2008-098364

(51) Int. Cl.
*G06K 15/00* (2006.01)
*G03G 15/00* (2006.01)

(52) U.S. Cl.
CPC .... *G03G 15/655* (2013.01); *G03G 2215/00523* (2013.01); *B65H 2701/11132* (2013.01)
USPC .......................... 358/1.12; 399/127; 271/3.14

(58) Field of Classification Search
USPC .............. 358/1.12, 1.13, 1.18; 270/18, 31–34
See application file for complete search history.

(56) References Cited

U.S. PATENT DOCUMENTS 7,728,992 B2 * 6/2010 Yamamoto et al. .......... 358/1.13
8,107,118 B2 * 1/2012 Edamatsu .................... 358/1.18
2004/0130088 A1 * 7/2004 Sato et al. .................... 271/3.14
2004/0263869 A1 * 12/2004 Kimura ......................... 358/1.12
2005/0041993 A1 * 2/2005 Barry et al. ................... 399/127
2006/0256389 A1 * 11/2006 Sakata et al. ................. 358/1.13
2008/0019726 A1 * 1/2008 Sakuraba et al. ............... 399/81

FOREIGN PATENT DOCUMENTS

JP 2002-3063 A 1/2002
JP 2006-168037 A 6/2006
JP 2007-290208 A 11/2007

OTHER PUBLICATIONS

Japanese Office Action for corresponding JP 2008-098364, mail date May 28, 2013.
JP OA issued Aug. 28, 2012 for corresponding JP2008-098364.

* cited by examiner

*Primary Examiner* — Benny Q Tieu
*Assistant Examiner* — Juan M Guillermety
(74) *Attorney, Agent, or Firm* — Rossi, Kimms & McDowell LLP

(57) ABSTRACT

A printing apparatus which is capable of appropriately discharging extra tab sheets, without placing the burden of removing the extra tab sheets on a user even in the case of attaching tab sheets into sheets to be subjected to reverse-order printing. An MFP controller determines a number of tab sheets to be attached to one copy of the printout of a print job. After causing discharge of extra tab sheets corresponding in number to a difference between the determined number and a number of tab sheets forming one set are discharged, the MFP causes the printout of the print job to be discharged starting with an N-th sheet.

17 Claims, 12 Drawing Sheets

PRINTING APPARATUS FOR INSERTING AT LEAST ONE TAB SHEET, METHOD OF CONTROLLING THE PRINTING APPARATUS, AND RECORDING MEDIUM

BACKGROUND OF THE INVENTION

1. Field of the Invention

The present invention relates to a printing apparatus which is capable of attaching tab sheets at a predetermined position of a printout printed by executing a print job, a method of controlling the printing apparatus, and a recording medium.

2. Description of the Related Art

Conventionally, there has been proposed a printing apparatus having a function of attaching tab sheets (also referred to as "tabbed sheets") at a predetermined position of a printout printed by executing a print job. As for tab sheets for use by the above-mentioned type of printing apparatus, a combination of a predetermined number of tab sheets is handled as one set. For example, a combination of five tab sheets is handled as one set. Now, it is assumed that three tab sheets are to be inserted into a printout of one copy printed by execution of a print job. In this case, when printing is carried out by setting one set of the five tab sheets, two excess tab sheets are left after printing a first copy. Then, if a second copy is printed out following the same procedure without discharging the excess tab sheets (two tab sheets in the present example), tab portions of five tab sheets in the second copy are arranged differently from those in the first copy. To solve this problem, there has been proposed a technique in which whenever printing per one copy is completed, excess tab sheets left in a sheet feeder (sheet cassette) are discharged into a discharging section to thereby prevent the tab portion arrangement of a plurality of copies from differing from each other (see e.g. Japanese Patent Laid-Open Publication No. 2002-003063). A method disclosed in Japanese Patent Laid-Open Publication No. 2002-003063 includes discharging sheets subjected to one-sided printing after inverting each printed sheet by an inversion path for inverting i.e. turning over a sheet such that the printed surface of the sheet faces downward (i.e. in a face-down state). This prevents the page order of the discharged sheets from being reversed.

Further, there have conventionally been proposed printing apparatuses of a type which is capable of discharging each sheet such that the printed surface thereof faces upward (i.e. in a face-up state). Since printed sheets are discharged face-up, the user can check contents on each of the discharged sheets without inverting the sheet. In this type of printing apparatus, image data items of a plurality of pages contained in a print job are temporarily stored in a memory, and then the stored image data items are sequentially read out in a descending page order (reverse order) from a final page, for printing. This makes it possible to prevent the page order of the sheets discharged face-up from being reversed.

However, in the case of attaching or inserting tab sheets into sheets discharged face-up as mentioned above, the tab sheets are also fed in the reverse order, and hence tab sheets which should originally be discharged as excess tab sheets are used. Therefore, the user is required to set tab sheets in a sheet feeder after manually removing excess tab sheets in advance by taking the number of tab sheets to be inserted into each set of sheets which are to be printed by executing a print job. The trouble of removing the excess tab sheets is burdensome to the user.

SUMMARY OF THE INVENTION

The present invention provides a printing apparatus which is capable of appropriately discharging an extra tab sheet, without placing the burden of removing the extra tab sheet on a user even in the case of attaching tab sheets into sheets to be subjected to reverse-order printing, a method of controlling the printing apparatus, and a recording medium.

In a first aspect of the present invention, there is provided a printing apparatus that attaches at least one tab sheet of a plurality of tab sheets to at least one predetermined position of one copy of a printout consisting of N recording sheets which are discharged by execution of a print job, comprising a determining unit configured to determine a number of the at least one tab sheet to be attached to the one copy of the printout of the print job, and a control unit configured to be operable in a case where the one copy of the printout according to the print job is printed, to perform control such that after at least one extra tab sheet corresponding in number to a difference between the number determined by the determining unit and a number of tab sheets forming one set is discharged, the printout of the print job is discharged starting with an N-th sheet.

In a second aspect of the present invention, there is provided a method of controlling a printing apparatus that attaches at least one tab sheet of a plurality of tab sheets to at least one predetermined position of one copy of a printout consisting of N recording sheets which are discharged by execution of a print job, comprising determining a number of the at least one tab sheet to be attached to one copy of the printout of the print job, and performing control such that after at least one extra tab sheet corresponding in number to a difference between the number determined by the determining and a number of tab sheets forming one set are discharged, the printout of the print job is discharged starting with an N-th sheet, when printing the one copy of the printout of the print job.

In a third aspect of the present invention, there is provided a recording medium that is computer-readable and stores a program for causing a computer to execute a method of controlling a printing apparatus that attaches at least one tab sheet of a plurality of tab sheets to at least one predetermined position of a printout consisting of N recording sheets which are discharged by execution of a print job, wherein the method comprises determining a number of the at least one tab sheet to be attached to the one copy of the printout of the print job, and performing control such that after at least one extra tab sheet corresponding in number to a difference between the number determined by the determining and a number of tab sheets forming one set is discharged, the printout of the print job is discharged starting with an N-th sheet; when printing one copy of the printout according to the print job.

According to the present invention, it is possible to appropriately discharge an extra tab sheet, without placing the burden of removing the extra tab sheets on a user, even in the case of attaching a tab sheet into sheets subjected to reverse-order printing.

The features and advantages of the invention will become more apparent from the following detailed description taken in conjunction with the accompanying drawings.

DETAILED DESCRIPTION OF THE EMBODIMENTS

The present invention will now be described in detail below with reference to the accompanying drawings showing embodiments thereof.

Figure 1:
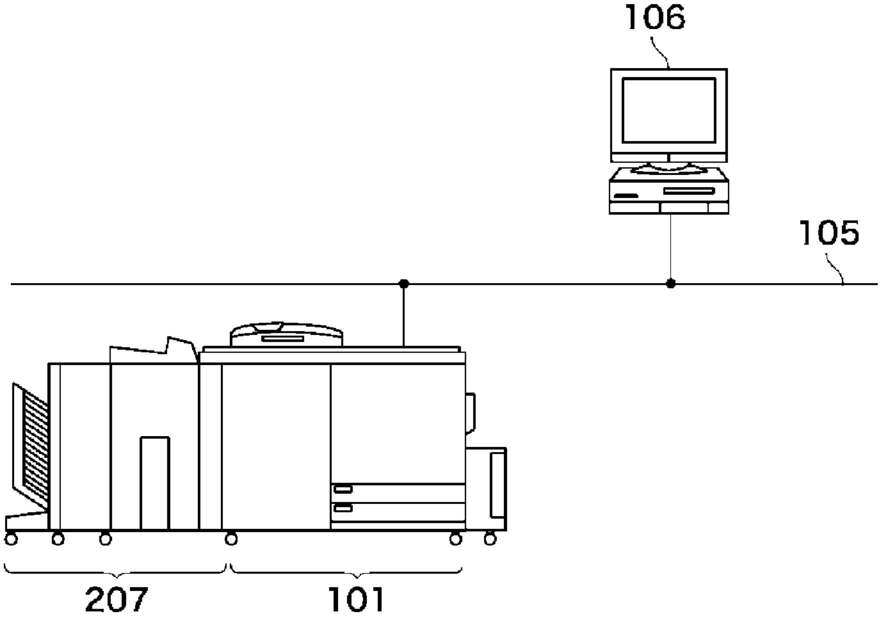
FIG. 1 is a system diagram of a printing system including an MFP as a printing apparatus according to embodiments of the present invention.

FIG. 1 is a system diagram of a printing system including an MFP as a printing apparatus according to embodiments of the present invention.

The MFP (Multi-Function Peripheral) 101 implementing the printing apparatus is capable of performing full-color scanning, printing, etc. For example, the MFP 101 is capable of developing and printing PDL (Page Description Language) data received from a computer terminal 106 via an external network 105. Further, the MFP 101 is connected to a post-processing unit 207 and configured to be capable of conveying printed sheets into the same. The post-processing unit 207 is capable of performing post-processing, such as stapling, punching, and folding, on sheets conveyed from the MFP 101.

The computer terminal 106 converts image data generated therein and print settings configured by a print driver into PDL data, and then sends the PDL data as a print job to the MFP 101 via the external network 105. The MFP 101 having received the print job develops the PDL data as the print job into image data and converts the image data into a printable data format, for printing.

The printing system shown in FIG. 1 has not only the above-described function (hereinafter referred to as the network printing function), but also a function of enabling the computer terminal 106 to display or store images scanned by the MFP 101 (hereinafter referred to as the network scanning function).

Next, the MFP 101 and the post-processing unit 207 appearing in FIG. 1 will be described with reference to FIG. 2.

Figure 2:
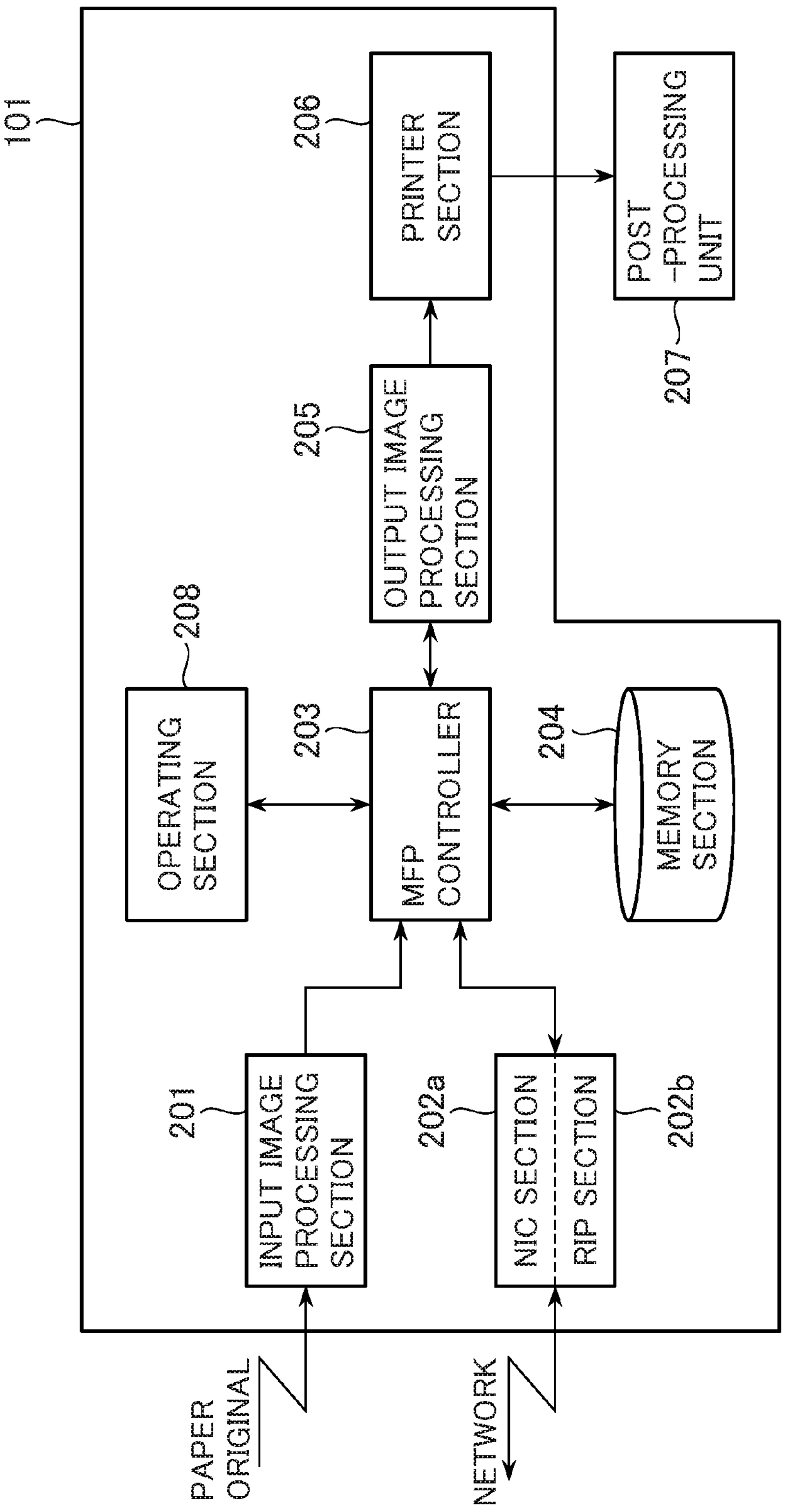
FIG. 2 is a block diagram of the MFP appearing in FIG. 1.

FIG. 2 is a block diagram of the MFP 101 and the post-processing unit 207 appearing in FIG. 1.

Figure 5:
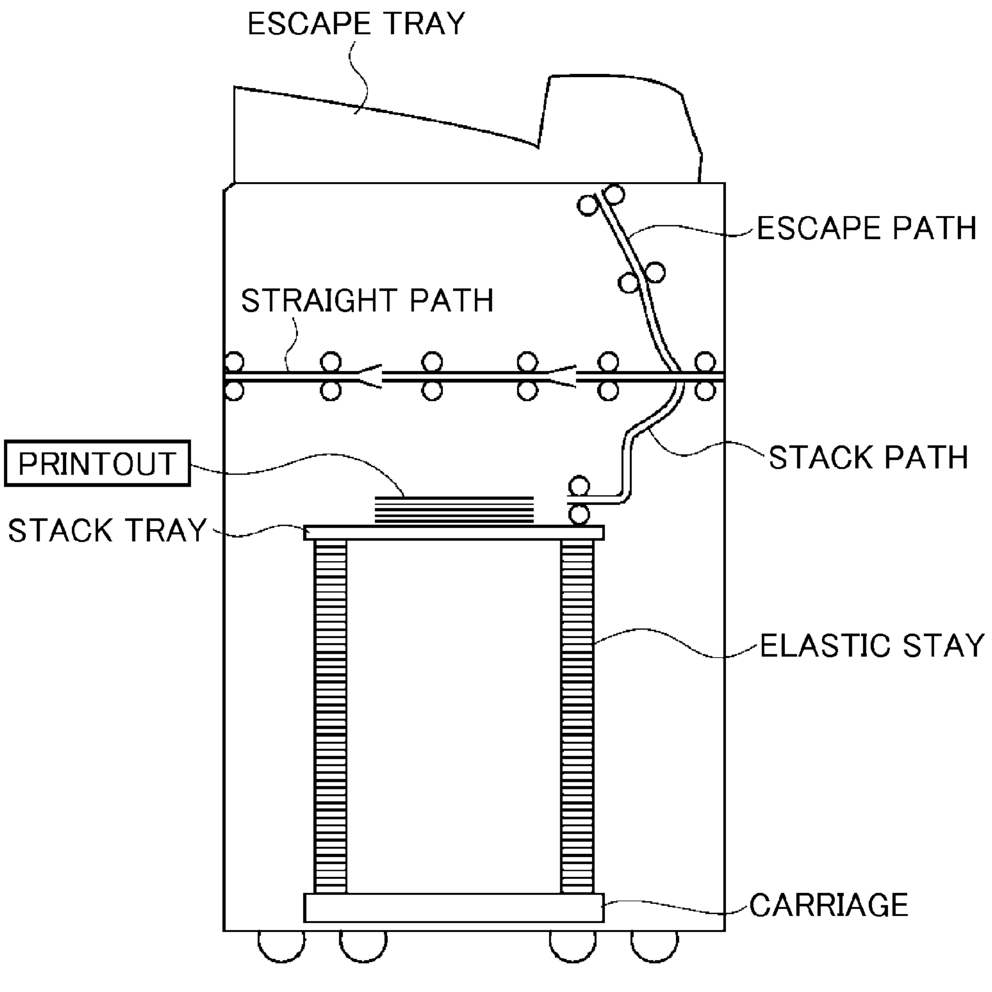
FIG. 5 is a schematic longitudinal cross-sectional view of a large-capacity stacker.

Referring to FIG. 2, an input image processing section 201 performs image processing on image data read by a scanner section 501 (not shown in FIG. 2 but appearing in FIG. 5). A NIC (Network Interface Card) section 202*a* transfers image data input via the external network 105 to a RIP section 202*b*. Further, the NIC section 202*a* sends out image data and apparatus information stored in the MFP 101, via the external network 105. The RIP section 202*b* analyzes input PDL data and carries out RIP (Raster Image Processing) development on the same.

Image data input to the input image processing section 201 and the NIC section 202*a*/RIP section 202*b* is delivered to an MFP controller 203. The MFP controller 203 controls transfer paths for input image data and data to be output. Image data input to the MFP controller 203 is temporarily stored in a memory section 204. The image data stored in the memory section 204 is called, as required, by the MFP controller 203.

An output image processing section 205 performs image processing on image data output from the MFP controller 203 and delivers the processed image data to a printer section 206. The printer section 206 feeds sheets and tabbed sheets (hereinafter simply referred to as "tab sheets") and sequentially prints image data items generated by the output image processing section 205 on the respective sheets. The sheets having the image data printed thereon are delivered into the post-processing unit 207 and are subjected to sheet sorting processing and sheet finishing processing.

An operating section 208 includes buttons, keys, and a display device, described hereinafter, and is used to select one of the above-mentioned various functions or to give an operation instruction. The operating section 208 makes it possible to preview image data stored in the memory section 204. Then, it is possible to print the image data after the user having previewed and checked the image data considers that there is no problem in printing the data. Now, flows of processing of image data are shown below in association with the respective functions of the MFP 101.

Copying function: input image processing section→output image processing section→printer section Network scanning function: input image processing section→NIC section Network printing function: NIC section→RIP section→output image processing section→printer section Box scanning function: input image processing section→output image processing section→memory section Box printing function: memory section→printer section Box reception function: NIC section→RIP section→output image processing section→memory section Box transmission function: memory section→NIC section Preview function: memory section→operating section Next, the operating section 208 appearing in FIG. 2 will be described with reference to FIG. 3.

Figure 3:
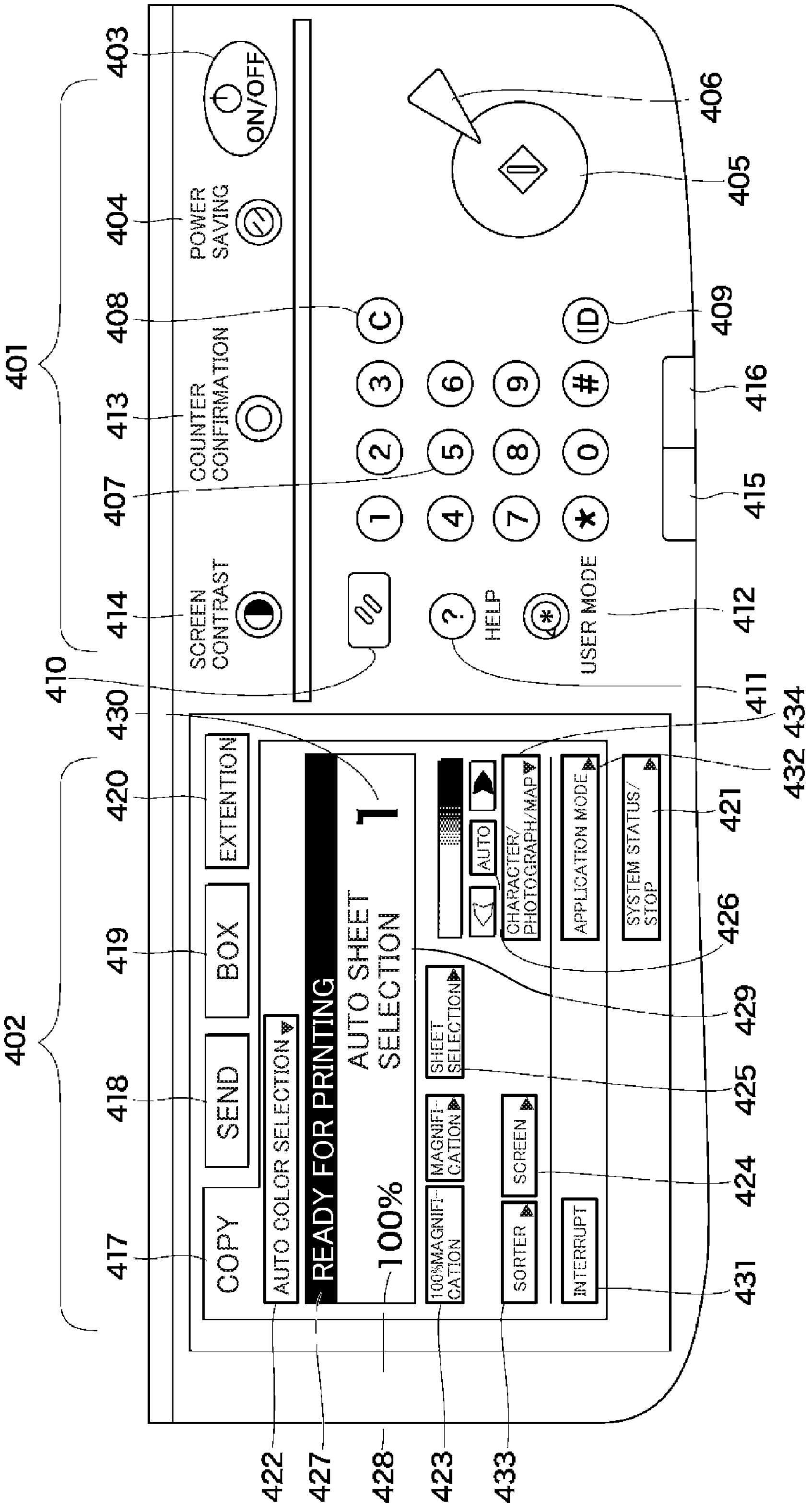
FIG. 3 is a view of the appearance of an operating section appearing in FIG. 2.

FIG. 3 is a view of the appearance of the operating section 208.

The operating section 208 is roughly comprised of a key input section 401 and a touch panel section 402.

The key input section 401 receives operational settings configured by a user. An operating section power supply switch 403 is used to switch the MFP 101 between a standby mode (normal operation state) and a sleep mode (i.e. a state where a main controller holds a program in stoppage while awaiting an interrupt, such as reception of a network print job or a reception of a facsimile transmission, so as to reduce power consumption).

A power saving key 404 is used to lower the control temperature of a fixing device in the MFP 101 in the standby mode so as to reduce power consumption. The control temperature can also be lowered by setting a power saving rate. A start key 405 is used to give an instruction for starting a copying operation, a transmission operation, or the like. A stop key 406 is used to stop an operation started in response to the instruction given via the start key 405. Ten keys 407 are used to enter numerals for various configurations, and a clear key 408 is used to cancel the entry of the numerals. An ID key 409 is used by the operator (user) of the MFP 101 so as to enter a preset password for user authentication.

A reset key 410 is used to nullify a configuration and reset the configuration to its default state. A help key 411 is used to display a guidance screen or a help screen. A user mode key 412 is used to perform transition to a user-specific system configuration screen. A counter confirmation key 413 is used to display the number of delivered sheets counted by a software counter provided in the MFP 101 for counting printed sheets. It is possible to display a delivered sheet count according to each operation mode (copying, printing, scanning, or facsimile), or according to each color mode (color or monochrome), or according to a sheet size (large or small).

A screen contrast dial 414 is used to adjust screen visibility e.g. by controlling a backlight for a liquid crystal display of the touch panel section 402. An execution/memory lamp 415 flashes on and off during job execution or memory access to thereby notify the user that a job is being executed or that the memory is being accessed. An error lamp 416 flashes on and off when it is impossible to execute a job, or when there occurs an error requiring a service call, a sheet jam, or depletion of consumables.

The touch panel section 402 is implemented by a touch panel display comprised of an LCD (Liquid Crystal Display) and transparent electrodes laminated on the LCD. When a portion of the transparent electrodes corresponding to a key displayed on the LCD is touched by a finger, the touch panel section 402 detects the touch and displays another operation screen according to the detected touch. FIG. 3 shows an initial screen in the standby mode. Thus, the touch panel section 402 is capable of displaying various operation screens in response to respective user operations.

A copy tab 417 is used to perform transition to an operation screen for a copying operation. A send tab 418 is used to perform transition to an operation screen for giving an instruction for a send operation, such as a facsimile send operation or an E-mail send operation. A box tab 419 is used to perform transition to a screen for inputting/outputting a job to/from a box (storage unit for storing jobs on a user-by-user basis). An option (extension) tab 420 is used to perform transition to a screen for configuring extension functions including the scanning function. A system monitor key 421 is used to display the status and conditions of the MFP 101. When one of the tab keys is selected, the MFP 101 is switched to an operation mode corresponding to the selected tab key.

A color selection/setting key 422 is used to pre-select one of a color copying mode, a monochrome copying mode, and an automatic selection mode. A magnification setting key 423 is used to perform transition to a screen for setting a magnification, such as 100% magnification, an enlargement ratio, or a reduction ratio. A post-processing configuration key 433 is used to perform transition to a screen for setting whether or not to carry out stapling or punching, the number of staples or punches, and stapling positions or punching positions, and so forth. A double-sided printing-setting key 424 is used to perform transition to a screen for selecting one of double-sided printing and one-sided printing. A sheet size-setting key 425 is used to perform transition to a screen for selecting a sheet feeder (sheet cassette), a sheet size, and a media type. An image mode-setting key 434 is used to select one of a character mode, a photograph mode, and so forth, as an image mode suited to an original image. A density setting key 426 is used to adjust the density of an image to be printed out.

A status display section 427 is used to display a status, such as a standby state, a warming-up state, occurrence of a sheet jam, or occurrence of an error, of the MFP 101 in a simplified fashion. A magnification display section 428 is used to display a magnification set by the magnification setting key 423. A sheet size display section 429 is used to display a sheet size set by the sheet size-setting key 425 or an automatic sheet selection mode. A sheet count display section 430 is used to display a sheet count specified by the ten keys 407 or the number of sheets having been printed during a current printing operation.

An interrupt key 431 is operated to cause another job to interrupt a copying operation, and an application mode key 432 is used to perform transition to a screen for carrying out various kinds of image processing, such as duplex-to-duplex copy, cover/interleaved sheet setting, reduced layout, and image shift, and configuring a layout. The application mode key 432 is also used to display a tab count-setting screen 801, described hereinafter with reference to FIG. 8, on the operating section 208.

Next, the outline of the operations of the respective sections of the MFP 101 from a power-off state to an operable state of the MFP 101 will be described with reference to FIG. 4.

Figure 4:
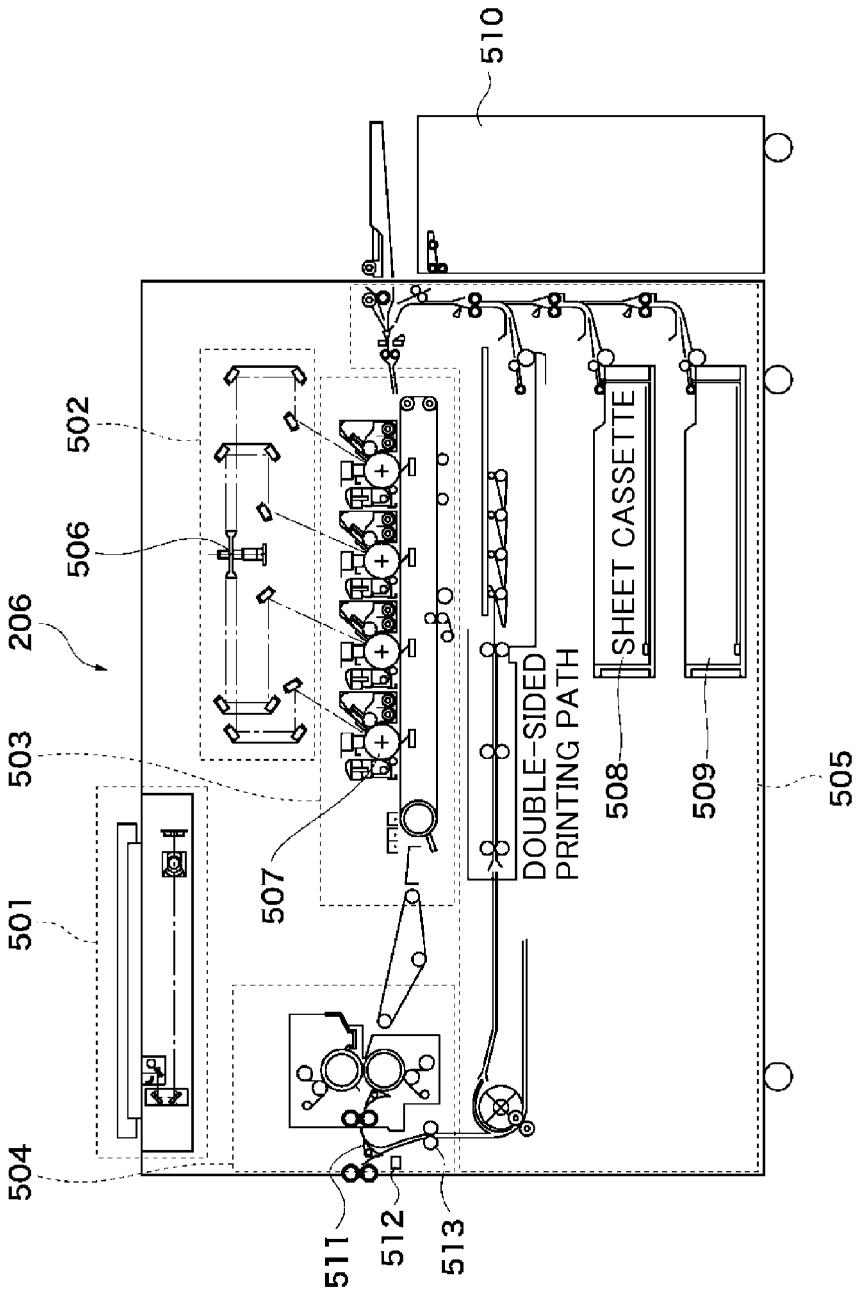
FIG. 4 is a schematic longitudinal cross-sectional view of the MFP.

FIG. 4 is a schematic longitudinal cross-sectional view of the MFP 101. It should be noted that a laser exposure section 502, an image forming section 503, a fixing section 504, and a sheet feeding/conveying section 505 cooperate to form the printer section 206 appearing in FIG. 2.

When the power supply of the MFP 101 is turned on, the MFP controller 203 instructs the scanner section 501, the laser exposure section 502, the image forming section 503, the fixing section 504, and the sheet feeding/conveying section 505 to start a preparation operation, and confirms the configuration of its devices at the same time. Thereafter, when the preparation operation of each section within the MFP 101 is completed to enable image forming operation, each of the sections notifies the MFP controller 203 that it is in an operable state. For example, the sheet feeding/conveying section 505 detects the size of sheets contained in each of sheet cassettes 508 and 509, the remaining amount (load amount) of the sheets contained in each of the sheet cassettes 508 and 509, and the operational status of a drive section (i.e. whether the drive section is operable or not), and notifies the MFP controller 203 of the result of the detection. The image forming section 503 notifies the MFP controller 203 of the amount of toner contained in a toner container.

Next, a description will be given of the outline of operations of the respective sections of the MFP 101 from a time point when an operation instruction is given by the MFP controller 203 with each of the sections in the operable state to a time point when sequential operations for printing is completely executed.

First, the MFP controller 203 issues an operation start command to the printer section 206.

Upon receiving the operation start command, the printer section 206 instructs the laser exposure section 502, the image forming section 503, the sheet feeding/conveying section 505, and the fixing section 504 to start a printing operation. The laser exposure section 502 starts rotation of a motor (polygon motor) for driving a polygon mirror 506. The image forming section 503 drives a photosensitive drum 507 for rotation and then charges the same. The fixing section 504 turns on a fixing heater to raise its temperature to a degree that enables toner on a sheet to be fixed on the sheet. The sheet feeding/conveying section 505 brings a drive unit (motor) into a state capable of performing sheet conveyance.

Next, when the sections all get ready for the printing operation, the MFP controller 203 gives an instruction for a printing operation on a page-by-page basis. For example, if a print job specifies 20 copies of 10 pages, the MFP controller 203 gives an instruction for a printing operation corresponding to 200 pages.

First, when it is possible to feed sheets, the sheet feeding/conveying section 505 feeds and conveys only one sheet to a predetermined position, and then notifies the MFP controller 203 that the sheet has reached the predetermined position. When it is impossible to feed sheets e.g. due to absence of sheets in the sheet cassette 508, the sheet feeding/conveying section 505 notifies the printer section 206 that sheet feeding is impossible.

The sheet feeding/conveying section 505 is provided with a multiple-feed detecting sensor for detecting whether or not sheets are being conveyed on a conveying path in a state overlapping each other and a thickness detecting sensor for detecting the thickness of a sheet. When the multiple-feed detecting sensor or the thickness detecting sensor detects multiple-feed or another abnormal state, the sheet feeding/conveying section 505 stops the feeding operation or conveying operation and notifies the MFP controller 203 of the abnormality. These sensors enable the MFP controller 203 to recognize a cause of stoppage of the operation, a position of a sheet remaining in the apparatus, and so forth. On the other hand, when a sheet is normally conveyed to the predetermined position, the MFP controller 203 instructs the image forming section 503 to start an image forming operation, in response to a notification from the sheet feeding/conveying section 505 that the sheet has reached the predetermined position. A toner image is transferred onto the sheet by this timing control.

The sheet having the toner image transferred thereon is conveyed to the fixing section 504, where toner on the sheet is fixed. The fixing section 504 has the temperature thereof monitored and controlled such that the temperature becomes equal to an appropriate fixing temperature, but when the amount of heat which the fixing section 504 is deprived of by a sheet is large, the temperature of the fixing section 504 falls. In this case, the fixing section 504 notifies the MFP controller 203 of the lowering of the temperature of the fixing section 504. Upon receiving this notification, the MFP controller 203 increases a sheet conveyance interval so as to prevent the temperature of the fixing section 504 from being further lowered. When the temperature of the fixing section 504 is still not restored, the operation is temporarily stopped, and the control is performed such that the operation is restarted after restoration of the temperature.

When printing in ascending page order (normal order) is designated, the sheet having toner fixed thereon by the fixing section 504 is conveyed into an inversion path by a flapper 511, and then is conveyed by a conveying roller pair 513 until the trailing end of the sheet reaches a position facing a sensor 512. When the sensor 512 detects the trailing end of the sheet, the MFP controller 203 causes reverse rotation of the conveying roller pair 513 to thereby convey the sheet such that the sheet is discharged out of the MFP 101 (conveyed into a sheet conveying path of the post-processing unit 207 in the case of the present embodiment, since the post-processing unit 207 is connected to the MFP 101). As a consequence, the sheet is inverted such that an image-formed surface thereof faces downward, and therefore the sheet is discharged face-down, i.e. with the printed surface (image-formed surface) thereof facing downward, from the post-processing unit 207 disposed downstream of the MFP 101. When normal-order printing is designated, the MFP controller 203 performs control such that N (N is a natural number equal to or larger than 1) recording sheets per one copy of printout discharged by execution of a print job are sequentially discharged in order from the first sheet to the N-th sheet.

On the other hand, when printing in descending page order, i.e. reverse order is designated, the sheet is conveyed by the flapper 511 to be discharged out of the MFP 101 (conveyed into a sheet conveying path of the post-processing unit 207 in the case of the present embodiment, since the post-processing unit 207 is connected to the MFP 101). As a consequence, the sheet is discharged face-up, i.e. with the printed surface (image-formed surface) thereof facing upward, from the post-processing unit 207 disposed downstream of the MFP 101. It should be noted that when double-sided printing is designated, the sheet is discharged with a first-page side facing upward. When reverse-order printing is designated, the MFP controller 203 performs control such that N recording sheets per one copy of printout discharged by execution of a print job are sequentially discharged in order from the N-th sheet to the first sheet.

The above-described operation is repeatedly carried out until printing corresponding in amount to the page count specified by the print job is completed. Then, when discharge of all the sheets is completed, the MFP controller 203 instructs each of the sections to stop its operation, receives a notification of operation stoppage from each of the sections, and then terminates the printing operation.

Next, the post-processing unit 207 (inline finisher) connectable to the MFP 101 at a location downstream of the same will be described with reference to FIGS. 5 and 6.

FIG. 5 is a longitudinal cross-sectional view of a large-capacity stacker as an example of the inline finisher. The large-capacity stacker in the present embodiment is configured to be capable of conveying a sheet conveyed from the MFP 101 upstream of the stacker into one of a stack path, an escape path, and a straight path.

The straight path is a sheet conveying path for conveying a sheet received from the upstream MFP 101 to a downstream saddle stitching/bookbinding unit. The escape path is a sheet conveying path used when it is desired to discharge a sheet onto an escape tray of the large-capacity stacker. The escape path is used e.g. in a case where a downstream sheet processing apparatus is not connected or in the case of carrying out a check operation (proof print) for checking an image printed on a sheet. The stack path is a sheet conveying path for conveying sheets to be stacked on a stack tray provided in the large-capacity stacker.

The stack tray appearing in FIG. 5 is disposed on an elastic stay or the like. The stack tray of the large-capacity stacker is configured such that a large number of sheets, e.g. 5000 sheets, can be stacked thereon. Further, the stack tray is connected to a carriage via the elastic stay, so that by attaching a handle, not shown, to the carriage, it is possible to transport a stack on the stack tray to another place.

The large-capacity stacker has a front door, and when the front door is kept closed, the elastic stay holds the stack tray up at a position where sheets discharged from the stack path can easily be stacked on the stack tray. On the other hand, when the front door is opened (or when an instruction for opening the front door is given) by the operator, the stack tray is lowered. It should be noted that along each of the sheet conveying paths within the large-capacity stacker, there are provided a plurality of sheet detecting sensors for detecting a sheet conveyance status or occurrence of a sheet jam.

Information obtained by the sheet detection is sent to the MFP controller 203 via a signal line, not shown, from each of the sensors of the large-capacity stacker. The MFP controller 203 grasps the status of sheet conveyance and occurrence of a sheet jam within the large-capacity stacker based on the information from the large-capacity stacker.

Figure 6:
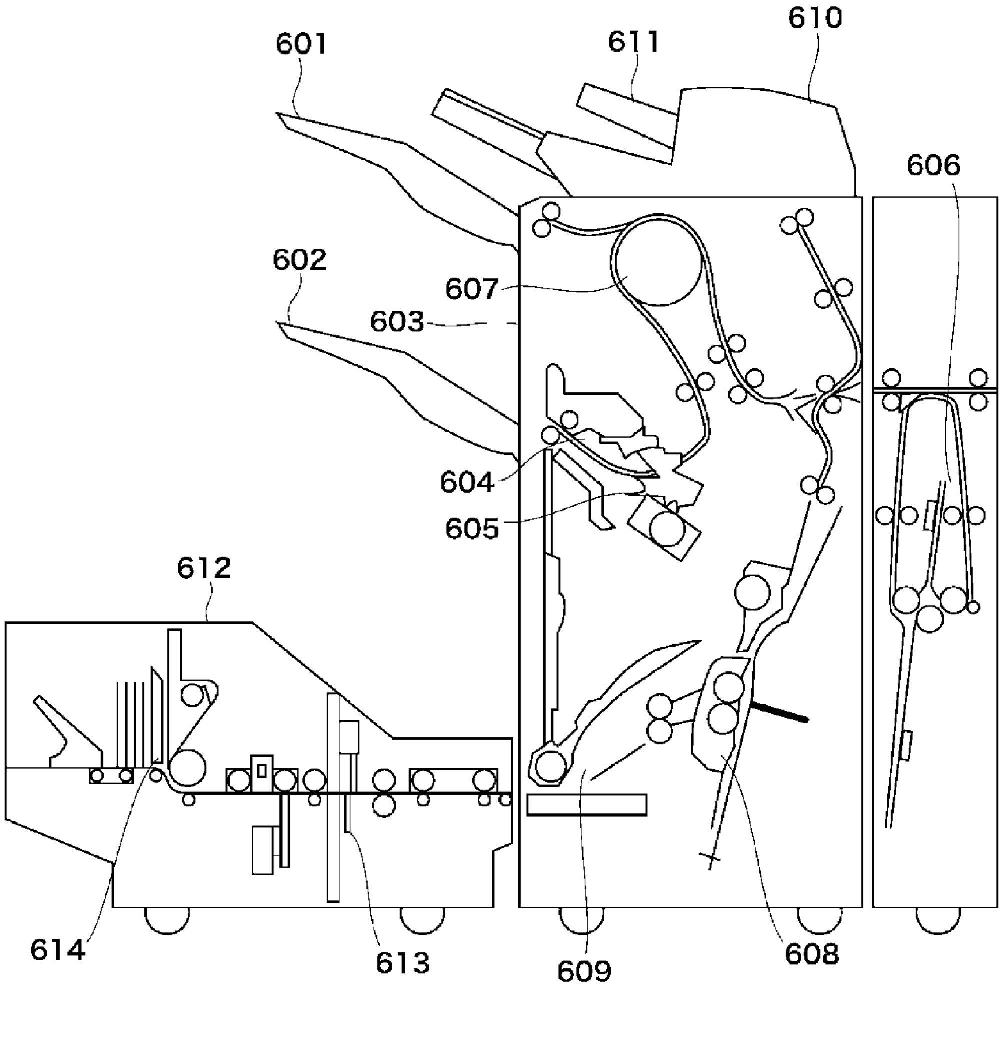
FIG. 6 is a schematic longitudinal cross-sectional view of a saddle stitching/bookbinding unit.

FIG. 6 is a schematic longitudinal cross-sectional view of the saddle stitching/bookbinding unit as an example of the inline finisher.

A sheet discharged from the straight path of the large-capacity stacker is conveyed into a Z-folding machine 606 of the saddle stitching/bookbinding unit. The saddle stitching/bookbinding unit shown in FIG. 6 is provided with a sample tray 601 and a stack tray 602, and discharges sheets by switching between the trays according to the kind of a job or the number of the sheets to be discharged.

When a staple mode is set for a print job to be output, the saddle stitching/bookbinding unit conveys sheets such that they are discharged onto the stack tray 602. In this case, a plurality of sheets are sequentially accumulated on a processing tray 604, and when sheets for one copy are accumulated, the sheets are bound on the processing tray 604 by a stapler 605, whereafter the sheet bundle is discharged onto the stack tray 602.

Further, the saddle stitching/bookbinding unit includes the Z-folding machine 606 and a puncher 607 for punching two (or three) holes for filing, and the Z-folding machine 606 or the puncher 607 carries out processing according to the kind of a job. For example, when the user configures sheet processing for a job to be output, via the operating section 208, such that Z-folding is executed, the saddle stitching/bookbinding unit causes the Z-folding machine 606 to carry out a folding process on sheets conveyed from the large-capacity stacker. Then, the sheets are passed through the saddle stitching/bookbinding unit to be discharged onto the stack tray 602 or the sample tray 601.

On the other hand, when the user configures sheet processing for a job to be output, via the operating section 208, such that punching is executed, the saddle stitching/bookbinding unit causes the puncher 607 to carry out the punching processing on sheets conveyed from the large-capacity stacker. Then, the sheets are passed through the saddle stitching/bookbinding unit to be discharged onto the stack tray 602 or the sample tray 601.

A saddle stitcher 608 stitches a central portion of a sheet bundle at two locations, and then carries out a process (bookbinding process) for folding the sheet bundle into two about the central portion of the same by bringing a roller into contact with the central portion, to thereby produce a pamphlet or booklet. The sheets bound by the saddle stitcher 608 are discharged onto a booklet tray 609. Whether or not to execute sheet processing, such as the bookbinding process, by the saddle stitcher 608 is also determined based on settings for sheet processing configured by the user according to a job to be output, as described above.

An inserter 610 is used to convey a sheet set on an insert tray 611 to one of the discharge trays, i.e. the stack tray 602 and the sample tray 601, without passing the sheet through the MFP 101. By using the inserter 610, it is possible to feed the sheet from the inserter 610 and insert the same between sheets delivered into the saddle stitching/bookbinding unit from the MFP 101.

When a printout formed into a booklet (saddle-stitched brochure) by the saddle stitcher 608 is conveyed to a trimmer 612, first, the printout is fed by an amount corresponding to a length predetermined by a roller and then is cut by a cutter section 613 by the amount corresponding to the predetermined length, whereby a rugged end of the booklet, i.e. irregular page ends are neatly trimmed, and then the booklet is held in a booklet holding part 614. Whether or not to execute sheet processing, such as cutting by the trimmer 612, is also determined based on settings for sheet processing configured by the user according to a job to be output, as described above.

Next, a printing control process for executing a print job with attachment (or insertion) of tab sheets specified will be described with reference to FIG. 7. The printing control process in FIG. 7 is carried out by the MFP controller 203 executing a program read out from the memory section 204.

Figure 7:
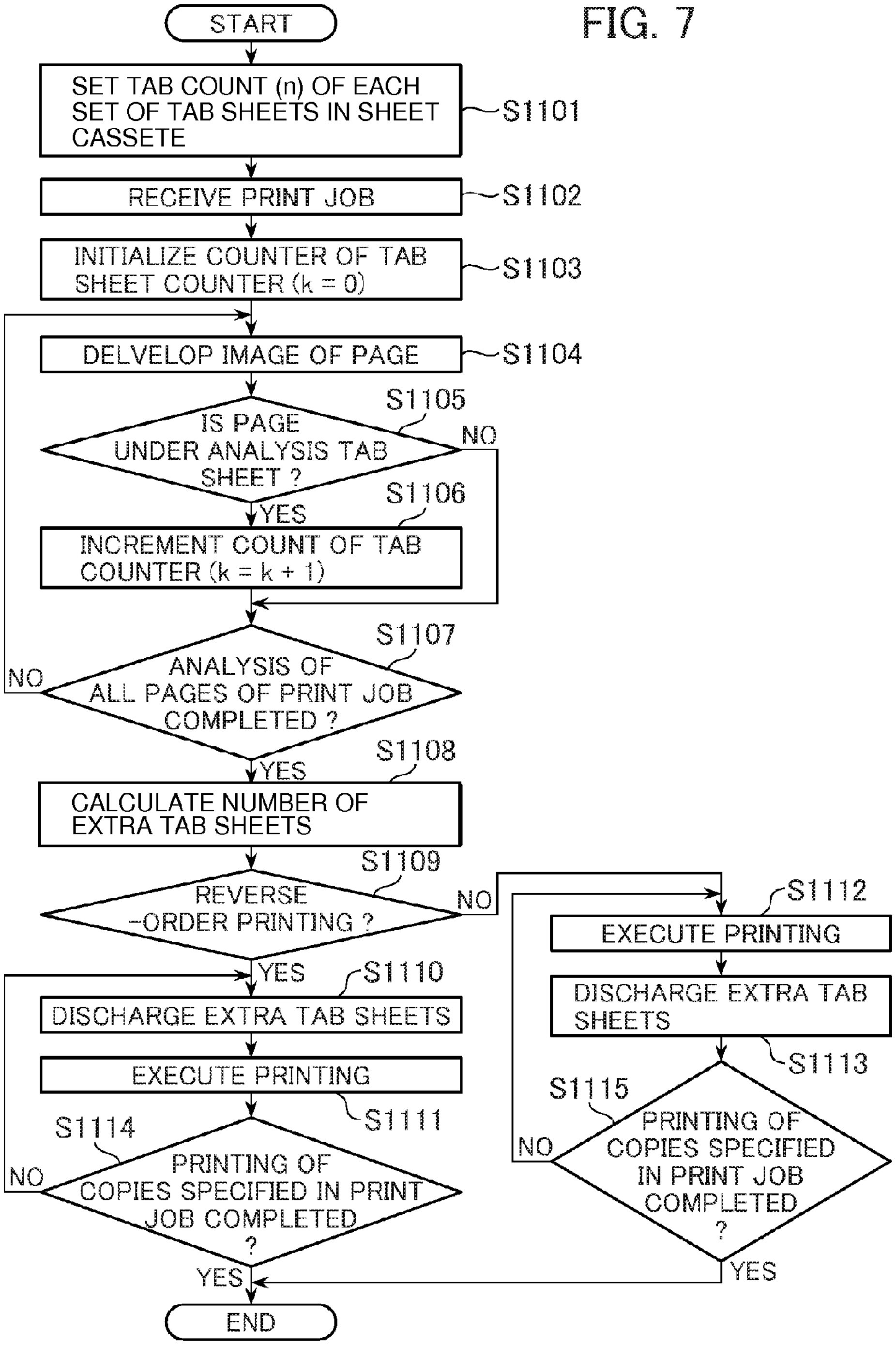
FIG. 7 is a flowchart of a printing control process executed by an MFP as a printing apparatus according to a first embodiment of the present invention.

It is assumed that tab sheets forming one or more sets each of a plurality of tab sheets are set in the sheet cassette 508 of the MFP 101 before execution of the printing control process in FIG. 7. Further, it is assumed that plain sheets are set in the sheet cassette 509, and the MFP controller 203 causes printing to be performed while selectively feeding a tab sheet or a plain sheet from the sheet cassette 508 or the sheet cassette 509. In the present embodiment, the tab sheets set in the sheet cassette 508 and the plain sheets set in the sheet cassette 509 are assumed to be of the same size.

Figure 8:
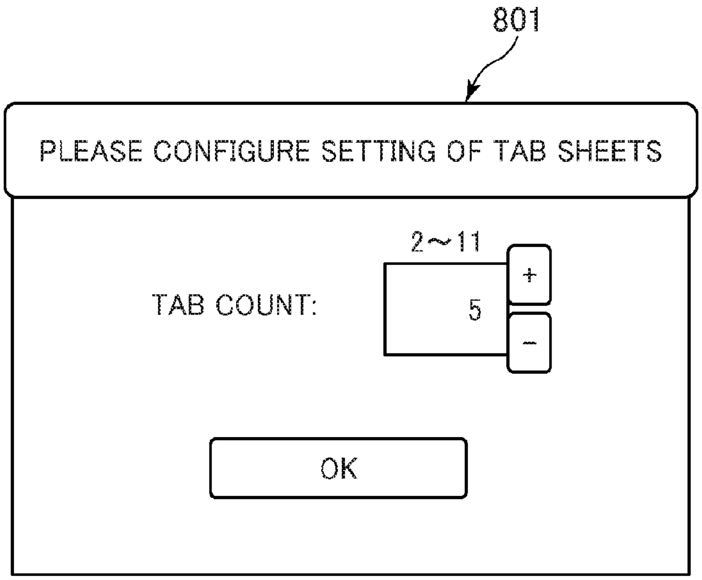
FIG. 8 is a view of an example of a tab count-setting screen displayed on a touch panel section.

In a step S1101, the MFP controller 203 causes the touch panel section 402 of the operating section 208 to display the tag count setting screen 801 shown in FIG. 8, based on an instruction from the user, and receives a setting of a tab count n corresponding to one set of tab sheets set in the sheet cassette 508. A predetermined number of tab sheets forms one set, and the number of tab sheets for one set corresponds to the number of tab portions of the tab sheet bundle. For example, the user sets a tab sheet bundle with five tab portions in the sheet cassette 508 and then causes the operating section 208 to display the tag count setting screen 801 for setting tab sheets in the sheet cassette 508. Then, the user sets the tab count to e.g. “5” via the tag count setting screen 801. When the tab count n is set by the user via the tag count setting screen 801, the MFP 101 stores the set tab count n in the memory section 204 in association with information on the sheet cassette 508.

In a step S1102, the MFP controller 203 receives a print job from the computer terminal 106 and stores image data and print configuration contained in the received print job in the memory section 204 in association with each other. This print configuration is specified on the computer terminal 106 by the user, and includes information on print layout, a discharge destination, and configuration for post-processing. Further, the print configuration includes information indicative of whether to carry out normal-order printing for printing the print job in ascending page order (i.e. in order from the first page to the N-th page) or reverse-order printing for printing the print job in descending page order (i.e. in order from the N-th page to the first page).

Next, in a step S1103, the MFP controller 203 initializes the count of a tab counter. For example, the MFP controller 203 sets the value of a variable k stored as a tab counter in the memory section 204 to “0”.

Then, in a step S1104, the MFP controller 203 causes image development to be executed for one page of the print job received in the step S1102. In a step S1105, the MFP controller 203 analyzes the page subjected to the image development to thereby determine whether or not the currently analyzed page is a tab sheet. If it is determined that the page is a tab sheet, the MFP controller 203 increments the count of the tab counter k in a step S1106.

As described above, in the steps S1104 to S1106, processing for counting the number of tabs to be inserted into a bundle of sheets printed by execution of the received print job is carried out.

If it is determined in the step S1105 that the currently analyzed page is not a tab sheet, the process proceeds to a step S1107, wherein the MFP controller 203 determines whether or not all pages of the print job have been analyzed. If the analysis of all the pages of the print job has not been completed, the process returns to the step S1104, whereas if the analysis has been completed, the process proceeds to a step S1108.

In the step S1108, the MFP controller 203 calculates an excess tab count (i.e. the number of excess tab sheets) based on the tab count n set by the user in the step S1101 and the tab count k incremented in the step S1106 and stored in the memory section 204. The excess tab count can be determined by the following equation (1):

$$\text{excess tab count}=n-(k \bmod n) \quad (1)$$

Next, in a step S1109, the MFP controller 203 determines whether or not the print job received in the step S1102 is one in which reverse-order printing is specified. If the print job received in the step S1102 is one in which reverse-order printing is specified, the process proceeds to a step S1110, whereas if not, the process proceeds to a step S1112. This determination as to whether or not to carry out reverse-order printing is performed based on the print settings configured by the user on the computer terminal 106 and contained in the print job.

In the step S1110, the MFP controller 203 causes tab sheets (excess tab sheets) corresponding in number to the sheet count calculated in the step S1108 to be discharged from the sheet cassette 508 onto a discharge tray, i.e. the stack tray 602 or the sample tray 601.

Next, in a step S1111, the MFP controller 203 awaits completion of discharge of the tab sheets in the step S1110 and then executes a print process based on the image developed in the step S1104. In the step S1111, the MFP controller 203 performs control such that the image data in the print job received in the step S1102 is subjected to reverse-order printing. Specifically, the MFP controller 203 reads out the image data items for a plurality of pages contained in the print job, which are stored in the memory section 204, in descending page order from the final page, and causes the printer section 206 to print the image data items.

Figure 13A:
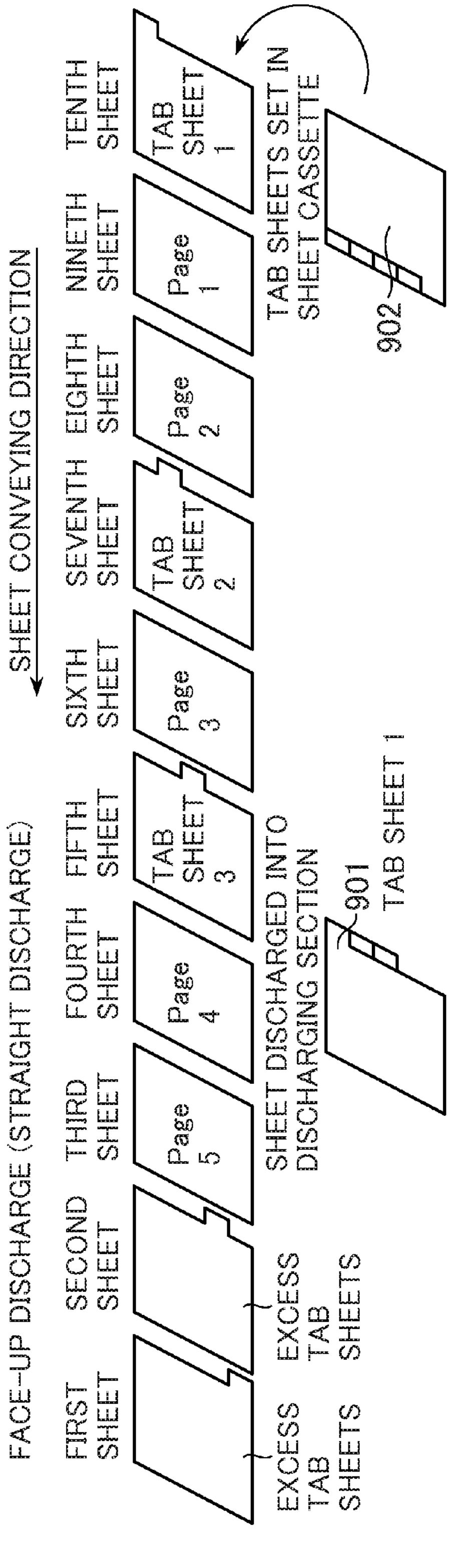
FIGS. 13A and 13B are schematic diagrams of respective examples of printouts each of which is obtained using three of one set of five tab sheets to form a left-bound document.

FIG. 13A is a schematic diagram useful in explaining the processing executed by the MFP controller 203 in the step S1110 to S1111. Tab sheets are set in the sheet cassette 508 by the user, in a state as denoted by reference numeral 902.

First in the step S1110, the MFP controller 203 causes the MFP 101 to discharge two excess tab sheets. Then, in the step S11111, the MFP controller 203 causes the MFP 101 to print and discharge third to tenth sheets including three tab sheets into a discharging section. It should be noted that each of schematic illustrations of first to tenth sheets shows the state of a corresponding sheet at a time point when the sheet passes the flapper 511 after toner on the sheet having been fixed on the same by the fixing section 504. When one copy has been printed as specified in the print job, the process proceeds to a step S1114. At this time, the sheet discharged into the discharging section is in a face-up state as denoted by reference numeral 901.

In the step S1114, the MFP controller 203 determines whether or not printing corresponding to a copy count specified by the print job has been completed. If the printing has not been completed, the process returns to the step S1110, whereas if the printing has been completed, the printing control process is terminated.

On the other hand, if it is determined in the step S1109 that reverse-order printing is not designated, the process proceeds to the step S1112, wherein the MFP controller 203 executes a print process based on the developed image. In the step S1112, the MFP controller 203 causes the printer section 206 to print the image data in ascending page order as specified in the print job received in the step S1102. Thereafter, in a step S1113, the MFP controller 203 causes excess tab sheets to be discharged which correspond in number to the sheet count of excess tab sheets calculated in the step S1108. FIG. 133 is a schematic diagram useful in explaining the processing executed by the MFP controller 203 in the step S1112 to S1113. Tab sheets are set in the sheet cassette 508 by the user as denoted by reference numeral 1002. First, the MFP controller 203 causes the MFP 101 to print and discharge first to eighth sheets including three tab sheets into the discharging section.

Next, in the step S1112, excess tab sheets as ninth and tenth sheets are discharged into the discharging section. It should be noted that each of schematic illustrations of first to tenth sheets shows the state of a corresponding sheet at a time point when the sheet passes the flapper 511 after toner on the sheet having been fixed on the same by the fixing section 504. After being in the state illustrated in FIG. 13B, each of the sheets is guided into the inversion path to be inverted and discharged. At this time, the sheets discharged into the discharging section are in a face-down state as denoted by reference numeral 1001. When one copy has been printed as specified in the print job, the process proceeds to a step S1115.

In the step S1115, the MFP controller 203 determines whether or not printing corresponding to a copy count specified by the print job has been completed. If the printing has not been completed, the process returns to the step S1112, whereas if the printing has been completed, the printing control process shown in FIG. 7 is terminated.

Although in the present embodiment, the user specifies whether or not to carry out reverse-normal printing using the computer terminal 106, the user may specify whether to discharge sheets face-up or face-down using the computer terminal 106. When it is specified that a printout by execution of a print job should be discharged face-up, the MFP controller 203 determines that reverse-order printing is designated. On the other hand, when it is specified that a printout discharged by execution of a print job should be discharged face-down, the MFP controller 203 determines that reverse-order printing is not designated (or normal-order printing is designated). In a case where this determining method is employed, if the MFP controller 203 determines in the step S1109 that face-up printing is designated, the process proceeds to the step S1110, whereas if the MFP controller 203 determines that face-down printing is designated, the process proceeds to the step S1112.

Alternatively, the MFP controller 203 may determine in the step S1109 whether or not to carry out reverse-order printing, based on post-processing configuration specified by an received print job. For example, as for sheets to be discharged by execution of a print job designating the stack tray of the large-capacity stacker as a discharge destination, the MFP controller 203 performs control such that reverse-order printing is carried out so as to automatically discharge the sheets face-up. As a consequence, each of the sheets delivered into the large-capacity stacker is in a state printed face-up, so that the user can check printed contents on the printed sheet without turning over the sheet.

Sheets stacked on the large-capacity stacker can be transported by a carriage so as to be subjected to post-processing in another post-processing apparatus (offline finisher). In this case, even when it is required to set the sheets either face-up or face-down in the other post-processing apparatus, the user can instruct the MFP 101 to output sheets in a state suited to the specification of the post-processing apparatus. For example, when it is required to set sheets face-up in the other post-processing apparatus, it is possible to deliver sheets in the face-up state into the large-capacity stacker to thereby eliminate the need for the user to invert the sheets.

Next, a description will be given of an operation carried out when a sheet jam occurs during printing. A sheet jam occurs when a sheet is caught on a sheet conveying path.

In recovery processing executed for a sheet jam occurring during printing, a page printed on a plain sheet can be recovered by printing the same page again on another plain sheet after a jammed page is removed. In this case, it is possible to use a sheet contained in the sheet cassette 508. However, when a tab sheet is jammed during printing, the recovery processing requires feed of another tab sheet of the same shape.

Figure 9:
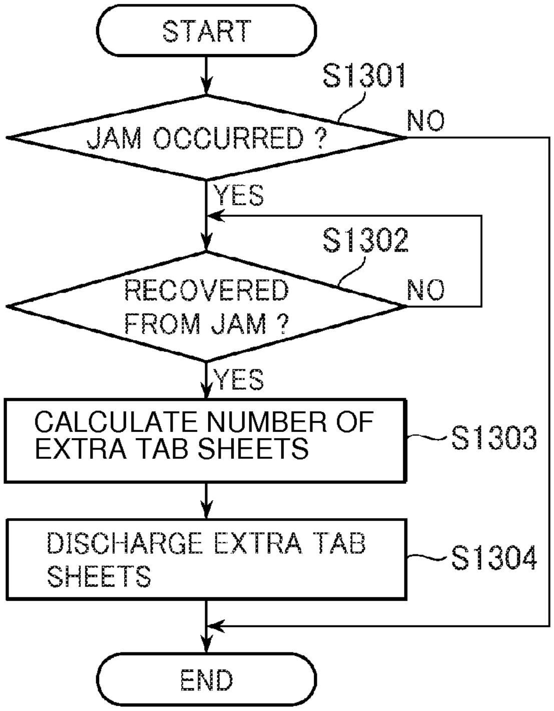
FIG. 9 is a flowchart of a jam-handling control process executed by the MFP as the printing apparatus according to the first embodiment.

FIG. 9 is a flowchart of a sheet jam-handling control process executed by the MFP 101 for discharging excess tab sheets when a sheet jam occurs in the MFP 101. The present jam-handling control process is executed as an interrupt process e.g. during execution of processing in the steps S1109 et seq. in FIG. 7.

During execution of processing in the steps S1109 et seq., the MFP controller 203 counts the number of fed tab sheets. For example, a variable x is provided in the memory section 204, and the MFP controller 203 initializes the variable x (i.e. sets x to 0) immediately before the start of the print job and increments the same whenever a sheet is fed from the sheet cassette 508 containing tab sheets. For example, the MFP controller 203 increments the variable x after giving a feed instruction to the sheet cassette 508 having tab sheets set therein so as to cause the same to feed one tab sheet. Alternatively, the MFP controller 203 may increment the variable x whenever a sheet detecting sensor, not shown, provided at the sheet feed port of the sheet cassette 508 detects that a sheet is fed. It should be noted that the sheet jam-handling control process shown in FIG. 9 is executed by the MFP controller 203 based on a program read out from the memory section 204.

The MFP controller 203 determines in a step S1301 whether or not a sheet jam has occurred. If a sheet jam has occurred, the process proceeds to a step S1302.

In the step S1302, the MFP controller 203 determines whether or not a jammed sheet has been removed by the user and the sheet jam has been resolved. If the sheet jam has been resolved, the process proceeds to a step S1303, wherein the MFP controller 203 counts the number of tab sheets left as excess due to occurrence of the sheet jam. Then, in a step S1304, the MFP controller 203 causes tab sheets corresponding in number to the calculated tab count to be discharged onto a discharge tray, i.e. the stack tray 602 or the sample tray 601. The number of tab sheets to be discharged can be determined by the following equation (2):

$$\text{the number of tab sheets to be discharged} = n - (x \bmod n) \tag{2}$$

It should be noted that calculation of an excess tab sheet count in the step S1303 may be performed before the sheet jam is resolved in the step S1302.

According to the above-described first embodiment, the MFP controller 203 of the MFP 101 having received a print job from the computer terminal 106 analyzes the print job and counts the number of tabs, followed by storing the counted number of tabs as an analysis result in the memory section 204. Then, the MFP controller 203 receives specification of the number of tab sheets set in the sheet cassette 508 (i.e. a tab count) from the user, and determines, based on print configuration for the received print job, whether or not reverse-order printing is designated for the print job. Further, the MFP controller 203 calculates the number of excess tab sheets based on the counted number of tabs and a tab count specified by the user, and performs control such that a calculated number of tab sheets are discharged from the sheet cassette 508.

When it is determined that a print job is specified such that reverse-order printing is performed; excess tab sheets are discharged before execution of the print process. Then, after completion of the discharge of the excess tab sheets, image data contained in the print job is printed. Thus, even in the case of carrying out reverse-order printing, i.e. in the case of inserting each tab sheet between ordinary sheets discharged face-up while preventing the sheet order from being reverse, it is possible to appropriately discharge excess tab sheets without placing the burden of removing the excess tab sheets on the user.

On the other hand, when it is determined that a print job is not specified such that reverse-order printing is performed, excess tab sheets are discharged after execution of the print process. As described above, the MFP controller 203 determines whether or not a print job is specified such that reverse-order printing is performed, and changes control for discharging excess tab sheets, according to the determination. Therefore, it is possible to appropriately discharge excess tab sheets irrespective of whether reverse-order printing is designated or ascending-page-order (normal-order) printing is designated.

Next, a printing apparatus according to a second embodiment of the present invention will be described with reference to FIGS. 10 to 12. The printing apparatus according to the second embodiment has the same constructions as that of the first embodiment shown in FIGS. 1 to 6. Therefore, the same components as those in the first embodiment are denoted by the same reference numerals and a detailed description thereof is omitted. The following description is given of points different from the first embodiment.

Figure 10:
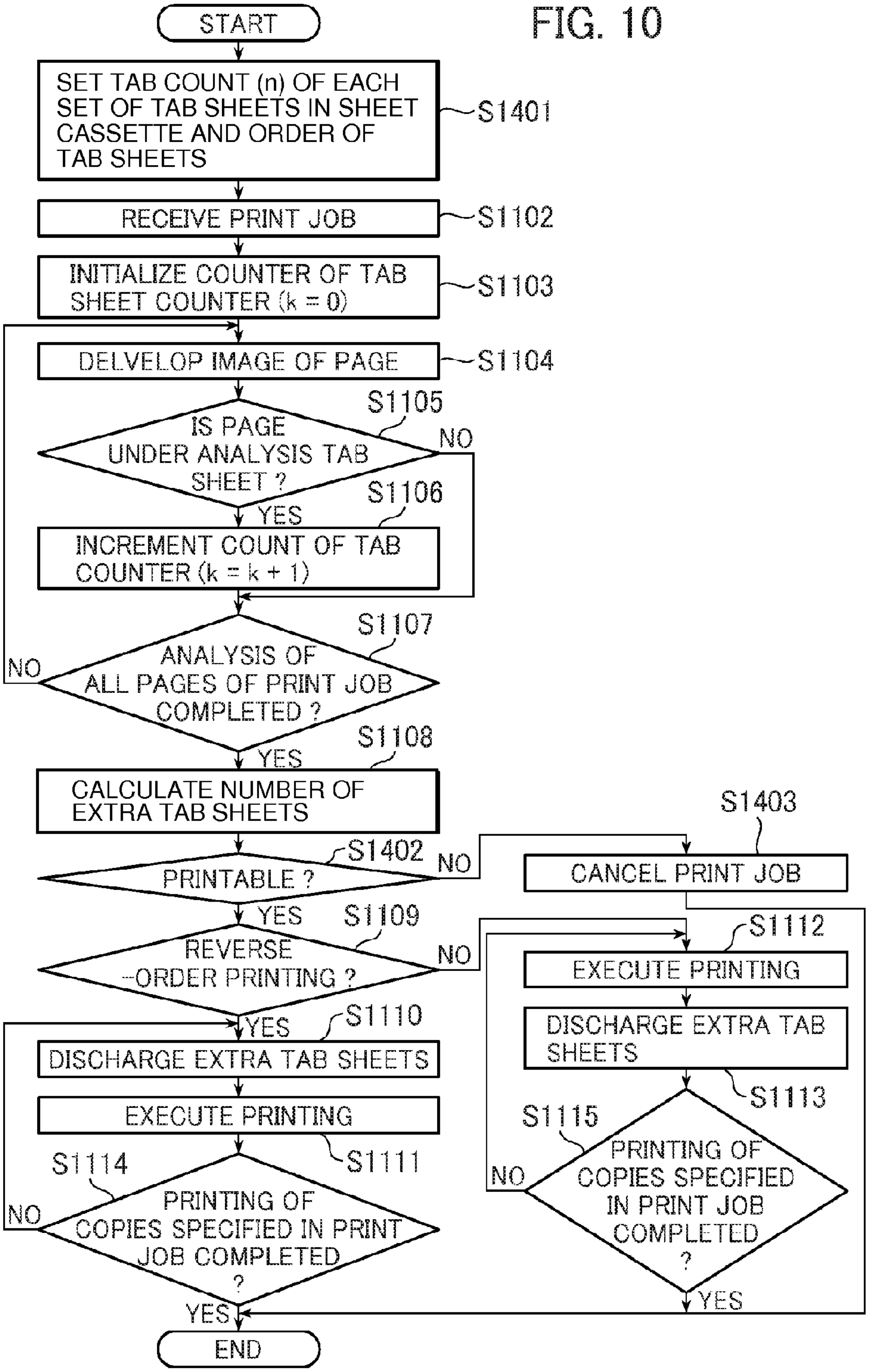
FIG. 10 is a flowchart of a printing control process executed by an MFP as a printing apparatus according to a second embodiment of the present invention.

FIG. 10 shows a printing control process for executing a print job with attachment (or insertion) of tab sheets specified. The printing control process in FIG. 10 is executed by the MFP controller 203 based on a program read out from the memory section 204.

It is assumed that tab sheets forming one or more sets each of a plurality of tab sheets are set in the sheet cassette 508 of the MFP 101 before execution of the printing control process in FIG. 10. Further, it is assumed that plain sheets are set in the sheet cassette 509, and the MFP controller 203 causes printing to be performed while selectively causing a tab sheet or a plain sheet to be fed from the sheet cassette 508 or the sheet cassette 509. It should be noted that in the present embodiment, the tab sheets set in the sheet cassette 508 and the plain sheets set in the sheet cassette 509 are of the same size.

Figure 11:
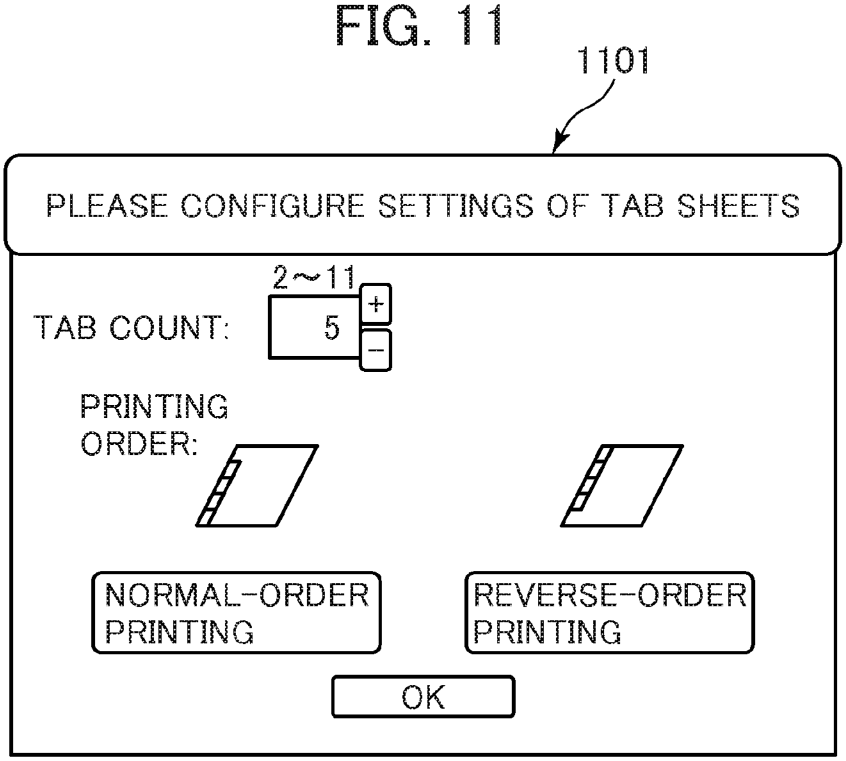
FIG. 11 is a view of an example of a tab count-setting screen displayed on the touch panel section.
Figure 12:
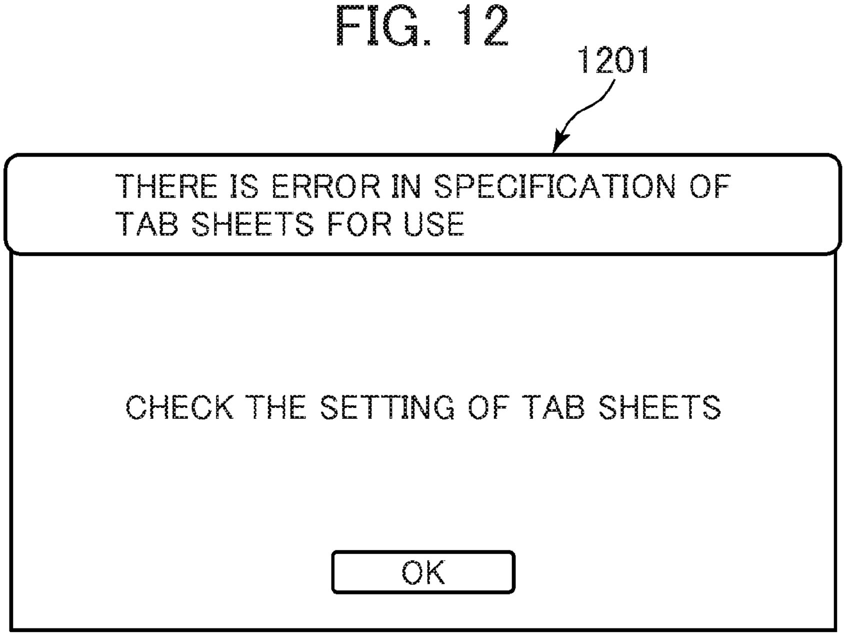
FIG. 12 is a view of an example of a message displayed on the touch panel section to recommend checking whether or not a tab count displayed on the touch panel section is properly specified.

In a step S1401, the MFP controller 203 causes the touch panel section 402 of the operating section 208 to display a tag count setting screen 1101 shown in FIG. 11, based on an instruction from the user, and receives a setting of a tab count n corresponding to one set of tab sheets set in the sheet cassette 508 via the tag count setting screen 1101.

Further, the MFP controller 203 receives a setting concerning whether or not the order of tab sheets set in the sheet cassette 508 is for normal-order printing or for reverse-order printing. A predetermined number of tab sheets forms one set, and the number of tab sheets for one set corresponds to the number of tab portions of the tab sheet bundle. For example, the user sets a tab sheet bundle with five tab portions in the sheet cassette 508 and then causes the operating section 208 to display the tag count setting screen 801 for setting tab sheets in the sheet cassette 508. Then, the user sets the tab count to e.g. “5” via the tag count setting screen 801. When the tab count n and the order of tab sheets are set by the user via the tag count setting screen 801, the MFP 101 stores the tab count n and the order of tab sheets in the memory section 204 in association with information on the sheet cassette 508.

In a step S1103, the MFP controller 203 receives a print job from the computer terminal 106 and stores image data and print configuration contained in the received print job in the memory section 204 in association with each other. This print configuration is specified by the user, and includes information on print layout, a discharge destination, and configuration for post-processing. Further, the print configuration includes information indicative of whether to carry out normal-order printing for printing the print job in ascending page order (i.e. in order from the first page to the N-th page) or reverse-order printing for printing the print job in descending page order (i.e. in order from the N-th page to the first page).

Next, in a step S1103, the MFP controller 203 initializes the count of a tab counter. For example, the MFP controller 203 sets the value of a variable k stored as a tab counter in the memory section 204 to “0”.

Then, in a step S1104, the MFP controller 203 causes image development to be executed for one page of the print job received in the step S1102. In a step S1105, the MFP controller 203 analyzes the page subjected to the image development to thereby determine whether or not the currently analyzed page is a tab sheet. If it is determined that the page is a tab sheet, the MFP controller 203 increments the count of the tab counter k in a step S1106. As described above, in the steps S1104 to S1106, processing for counting the number of tabs to be attached to a printout by execution of the received print job is carried out.

If it is determined in the step S1105 that the currently analyzed page is not a tab sheet, the process proceeds to a step S1107, wherein the MFP controller 203 determines whether or not all pages of the print job have been analyzed. If the analysis of all the pages of the print job has not been completed, the process returns to the step S1104, whereas if the analysis has been completed, the process proceeds to a step S1108.

In the step S1108, the MFP controller 203 calculates an excess tab count (i.e. the number of excess tab sheets) based on the tab count n set by the user in the step S1101 and the tab count k incremented in the step S1106 and stored in the memory section 204. The excess tab count can be determined by the following equation (1):

$$\text{excess tab count}=n-(k \bmod n) \quad (1)$$

Next, in a step S1402, the MFP controller 203 determines from the order of tab sheets (printing order of the same) and the print settings of the received print job whether or not it is possible to perform printing. For example, in a case where in spite of an instruction of reverse-order printing designated in a print job received from the computer terminal 106, if there are no sheet cassettes 508 containing tab sheets set in an order for reverse-order printing, it is determined that printing can be executed. When it is determined that printing cannot be executed, the MFP controller 203 causes such a message as illustrated in FIG. 12 to be displayed on the touch panel section 402, for prompting the user to check whether the setting of tab sheets is correct.

It should be noted that a sheet cartridge (sheet cassette 508 in the present embodiment) in which tab sheets are set may be identified by referring to information stored in the memory section 204, and the identified sheet cassette may be displayed in a manner enabling the user to recognize it. Further, a key may be provided which causes a screen to be displayed for enabling the user to change the setting of the identified sheet cassette. This enables the user to easily change the setting of the sheet cassette in which tab sheets are set, via the displayed screen.

If it is determined in the step S1402 that printing cannot be executed, the MFP controller 203 cancels the print job in a step S1403. Alternatively, the MPF controller 203 may perform control such that the print job is temporarily stopped, and after waiting for the user to change the setting of a sheet cassette in which tab sheets are set, the process proceeds to a step S1109 after the setting is changed.

On the other hand, if it is determined in the step S1402 that printing can be performed for the job, the MFP controller 203 determines whether or not the print job designated in the step S1102 is one in which reverse-order printing is specified. The method for this determination is the same as described in the first embodiment, and hence a detailed description thereof is omitted.

If it is determined in the step S1109 that the print job is one in which reverse-order printing is specified, the process proceeds to a step S1110, whereas if not, the process proceeds to a step S1112. In the step S1110, the MFP controller 203 causes tab sheets (excess tab sheets) corresponding in number to the sheet count calculated in the step S1108 to be discharged from the sheet cassette 508 onto a discharge tray, i.e. the stack tray 602 or the sample tray 601.

Next, in a step S1111, the MFP controller 203 awaits completion of discharge of the tab sheets in the step S1110 and then executes a print process based on the image developed in the step S1104. In the step S1111, the MFP controller 203 performs control such that the image data in the print job received in the step S1102 is subjected to reverse-order printing. Specifically, the MFP controller 203 reads out the image data items for a plurality of pages contained in the print job, which are stored in the memory section 204, in descending page order from the final page, and causes the printer section 206 to print the image data items.

FIG. 13A is a schematic diagram useful in explaining the processing executed by the MFP controller 203 in the step S1110 to S1111. Tab sheets are set in the sheet cassette 508 by the user, in a state as denoted by reference numeral 902. First in the step S1112, the MFP controller 203 causes the MFP 101 to discharge two excess tab sheets. Then, in the step S111, the MFP controller 203 causes the MFP 101 to print and discharge third to tenth sheets including three tab sheets into a discharging section. It should be noted that each of schematic illustrations of first to tenth sheets shows the state of an associated sheet at a time point when the sheet passes the flapper 511 after toner on the sheet having been fixed on the same by the fixing section 504.

When one copy has been printed as specified in the print job, the process proceeds to a step S1114. At this time, the sheet discharged into the discharging section is in a face-up state as denoted by reference numeral 901.

In the step S1114, the MFP controller 203 determines whether or not printing corresponding to a copy count specified by the print job has been completed. If the printing has not been completed, the process returns to the step S1110, whereas if the printing has been completed, the printing control process shown in FIG. 10 is terminated.

If it is determined in the step S1109 that reverse-order printing is not designated, the process proceeds to the step S1112, wherein the MFP controller 203 executes a print process based on the developed image. In the step S1112, the MFP controller 203 causes the printer section 206 to print the image data in ascending page order as specified in the print job received in the step S1102. Thereafter, in a step S1113, the MFP controller 203 causes discharges excess tab sheets to be discharged which correspond in number to the sheet count of excess tab sheets calculated in the step S1108.

Figure 13B:
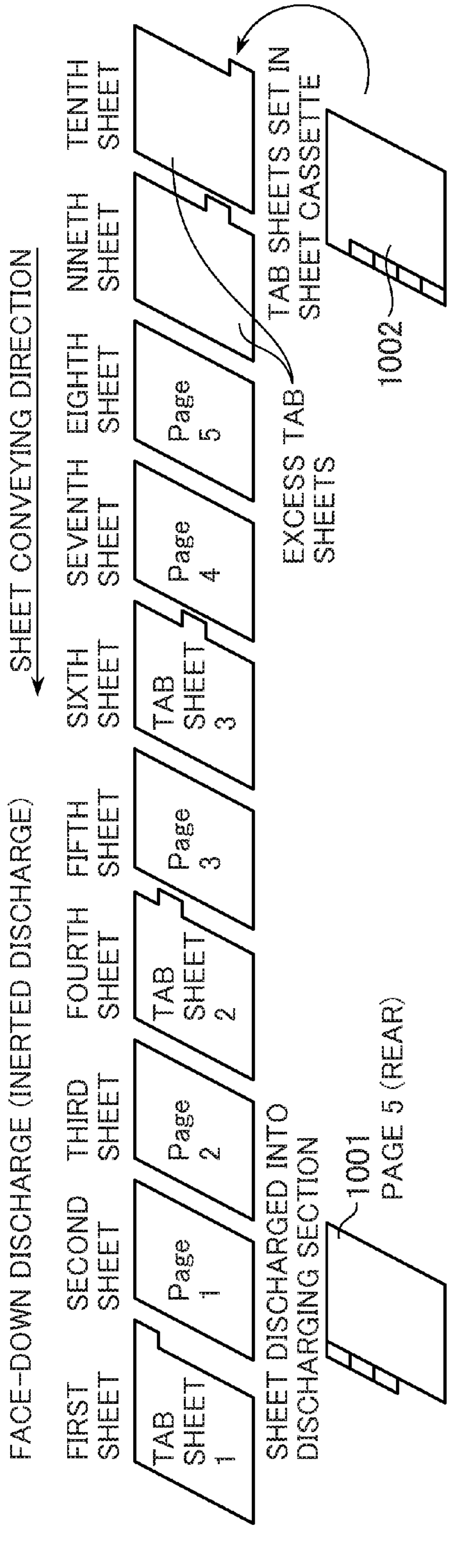

FIG. 13B is a schematic diagram useful in explaining the processing executed by the MFP controller 203 in the step S1112 to S1113. Tab sheets are set in the sheet cassette 508 by the user as denoted by reference numeral 1002.

First, the MFP controller 203 causes the MFP 101 to print and discharge first to eighth sheets including three tab sheets into the discharging section. It should be noted that each of schematic illustrations of the first to tenth sheets shows the state of a corresponding sheet at a time point when the sheet passes the flapper 511 after toner on the sheet having been fixed on the same by the fixing section 504. After being in the state illustrated in FIG. 13B, each of the sheets is guided into the inversion path to be inverted and discharged. At this time, the sheets discharged into the discharging section are in a face-down state as denoted by reference numeral 1001. When one copy has been printed as specified in the print job, the process proceeds to a step S1115.

In the step S1115, the MFP controller 203 determines whether or not printing corresponding to a copy count specified by the print job has been completed. If the printing has not been completed, the process returns to the step S1112, whereas if the printing has been completed, the printing control process shown in FIG. 10 is terminated.

It should be noted that in the second embodiment as well, the sheet jam-handling control process shown in FIG. 9 can be applied, and in case a sheet jam occurs during printing, it is possible to properly discharge tab sheets made extra due to the sheet jam.

According to the above-described second embodiment, the MFP controller 203 having received a print job from the computer terminal 106 analyzes the print job and counts the number of tabs, followed by storing the counted number of tabs in the memory section 204. Then, the MFP controller 203 receives the setting of the number of tab sheets in the sheet cassette 508 (i.e. a tab count) and the setting of the order of tab sheets from the user, and if printing can be executed based on the received order of tab sheets, it is determined whether or not execution of reverse-order printing is set.

Further, the MFP controller 203 calculates the number of excess tab sheets based on the counted number of tabs and a tab count specified by the user, and performs control such that a calculated number of tab sheets are discharged from the sheet cassette 508. When it is determined that a print job is specified such that reverse-order printing is performed, excess tab sheets are discharged before execution of the print process. Then, after completion of the discharge of the excess tab sheets, image data contained in the print job is printed. Thus, even in the case of carrying out reverse-order printing, i.e. in the case of inserting each tab sheet between ordinary sheets discharged face-up while preventing the sheet order from being reverse, it is possible to appropriately discharge excess tab sheets.

On the other hand, when it is determined that a print job is not specified such that reverse-order printing is performed, excess tab sheets are discharged after execution of the print process. As described above, the MFP controller 203 determines whether or not a print job is specified such that reverse-order printing is performed, and changes control for discharging excess tab sheets, according to the determination. Therefore, it is possible to appropriately discharge excess tab sheets irrespective of whether reverse-order printing is designated or normal-order printing is designated.

Further, according to the second embodiment, the user is capable of setting information on whether tab sheets are set for normal-order printing or for reverse-order printing, on a sheet cassette-by-sheet cassette basis. The MFP controller 203 determines, when the user has set reverse-order printing, whether or not there is a sheet cassette in which tab sheets are set for reverse-order printing. When it is determined that there is a sheet cassette in which tab sheets are set for reverse-order printing, the MFP controller 203 determines that printing can be executed, and when it is not determined that there is a sheet cassette in which tab sheets are set for reverse-order printing, the MFP controller 203 determines that printing cannot be executed. When it is determined that printing cannot be executed, the MPF controller 203 can cancel the print job.

The printing apparatuses according to the first and second embodiments are described by taking an example in which the MFP controller 203 of the MFP 101 receives PDL data from the computer terminal 106, and performs image development processing to convert the data into a data format enabling the MFP 101 to print the same.

However, the MFP 101 may be connected to an external controller, not shown, and the external controller may execute the processes described in the first and second embodiments. If the external controller is connected, the MFP controller 203 is not required to perform the above-described processes, and hence the burden on the MFP controller 203 can be reduced. On the other hand, if there is no such external controller is connected, the costs of introducing the printing system including the MPF 101 can be reduced.

Further, although the MFP 101 in the first and second embodiments is described by taking an example in which a print job is received from the computer terminal 106, a print job may be received via the operating section 208 of the MFP 101. In this case, the MFP controller 203 sets image data obtained from the scanner 501 and print settings received from the operating section 208 as a print job, and stores the print job in the memory section 204.

Hereafter, a configuration of a program readable by the printing apparatus according to the present invention will be described with reference to a memory map shown in FIG. 14.

Figure 14:
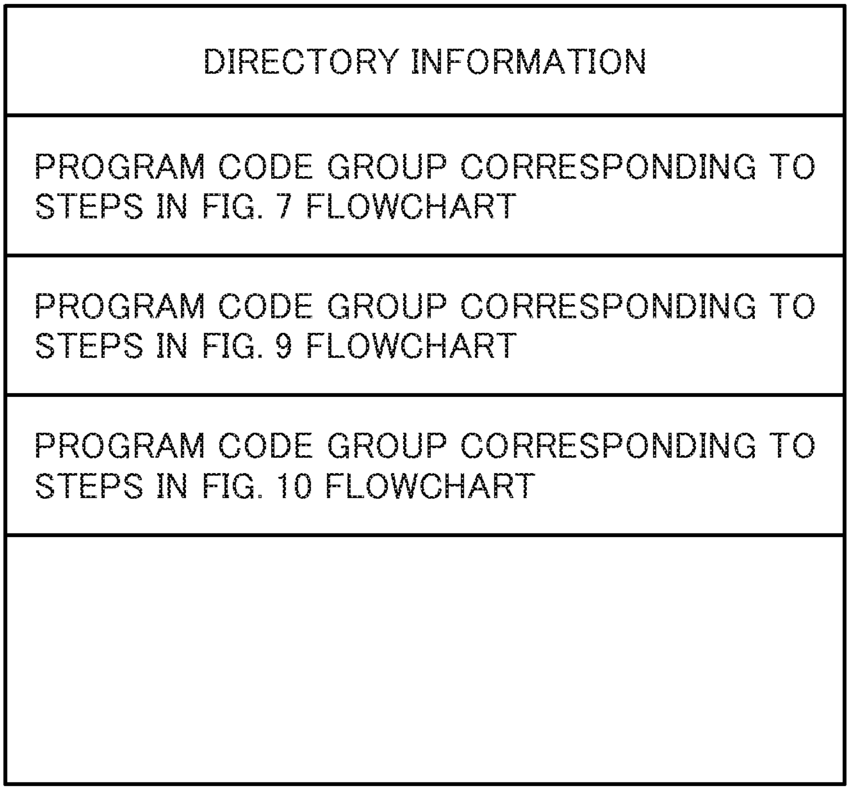
FIG. 14 is a diagram which is useful in explaining a memory map of a storage medium storing various program groups readable by the printing apparatus according to the present invention for execution.

FIG. 14 is a diagram which is useful in explaining the memory map of a storage medium storing various program groups readable by the printing apparatus according to the present invention for execution.

Although not specifically shown, information for managing the program groups stored in the storage medium, e.g. version information and creators, is also stored, as well as information depending on an OS which reads out the program groups, e.g. icons for identifying respective programs, is also stored, depending on the case.

Further, data belonging to various programs are also stored in the storage medium. Further, a program for installing the programs into a computer, and a program for decompressing installation programs which are compressed are also sometimes stored.

The functions of the embodiments may be executed by a host computer using programs which are installed from the outside of the printing apparatus. In this case, information groups including programs may be supplied to a printing apparatus e.g. from any of computer-readable storage media including a CD-ROM, a flash memory, and a FD, or from an external memory device via a network. The present invention is also applicable to this cases.

It is to be understood that the present invention may also be accomplished by supplying a system or an apparatus with a storage medium in which a program code of software, which realizes the functions of any of the above described embodiments, is stored, and causing a computer (or CPU or MPU) of the system or apparatus to read out and execute the program code stored in the storage medium.

In this case, the program code itself read from the storage medium realizes the functions of any of the above described embodiments, and therefore the program code and the storage medium in which the program code is stored constitute the present invention.

Therefore, insofar as the functions of a program are provided, it does not matter whether the program is in any of the forms of an object code, a program executed by an interpreter, script data supplied to an OS, and so forth.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively the program may be downloaded via a network.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code. In this case, the program code is supplied directly from a storage medium storing the program code, or is supplied by being downloaded from another computer, a database, or the like, not shown, connected to the Internet, a commercial network, a local area network or the like.

Although in the embodiments described above, the printing method of the MFP is assumed to be an electrophotographic one, by way of example, this is not limitative, but the present invention is applicable to a printing apparatus based on any of suitable methods including an inkjet method, a thermal transfer method, a heat-sensitive method, an electrostatic method, and a discharge breakdown method.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-098364 filed Apr. 4, 2008, which is hereby incorporated by reference herein in its entirety.

What is claimed is:

1. A printing apparatus that feeds at least one tab sheet of a plurality of tab sheets from a sheet storage unit and inserts the at least one tab sheet to at least one predetermined position of one copy of a printout comprising N recording sheets, the printing apparatus comprising:

a printing unit configured to output the printout;

a first determining unit configured to determine whether said printing unit outputs the printout from a first recording sheet or from an N-th recording sheet;

a second determining unit configured to determine whether the sheet storage unit stores the plurality of tab sheets in a first order for inserting the plurality of tab sheets in the printout output from the first recording sheet or in a second order for inserting the plurality of tab sheets in the printout output from the N-th recording sheet;

a control unit configured to permit said printing unit to output the printout from the N-th recording sheet in a case where said first determining unit determines that said printing unit output the printout from the N-th recording sheet and said second determining unit determines that the sheet storage unit stores the plurality of tab sheets in the second order; and a display control unit configured to control a display unit to display an error message in a case where said first determining unit determines that said printing unit outputs the printout from the N-th recording sheet and said second determining unit determines that the sheet storage unit stores the plurality of tab sheets in the first order.

2. The printing apparatus according to claim 1, wherein the control unit controls, in a case where said first determining unit determines that said printing unit outputs the printout from the N-th recording sheet and said second determining unit determines that the sheet storage unit stores the plurality of tab sheets in the second order, after at least one extra tab sheet is discharged, the printing unit to discharge the printout from the N-th recording sheet.

3. The printing apparatus according to claim 2, wherein, in a case where said first determining unit determines that said printing unit outputs the printout from the first recording sheet, said control unit controls the printing unit to discharge the printout from the first recording sheet, and after the N-th recording sheet is discharged, the printing apparatus to discharge the at least one extra tab sheet.

4. The printing apparatus according to claim 2, wherein, in a case where the printout is to be discharged in a face-up state, said control unit controls, after the at least one extra tab sheet is discharged, the printing unit to discharge the printout from the N-th recording sheet.

5. The printing apparatus according to claim 2, wherein, in a case where the printout is to be discharged in a face-down state, said control unit controls the printing unit to discharge the printout from the first recording sheet, and after the N-th recording sheet is discharged, the printing apparatus to discharge the at least one extra tab sheet.

6. The printing apparatus according to claim 2, wherein, said control unit controls the printing apparatus to discharge the at least one extra tab sheet into a discharging section different from a discharging section where the printout is discharged.

7. The printing apparatus according to claim 1, wherein the error message indicates that the sheet storage unit does not store the plurality of tab sheets in the second order for inserting the plurality of tab sheets in the printout output from the N-th recording sheet.

8. A printing apparatus that feeds at least one tab sheet of a plurality of tab sheets from a sheet storage unit and inserts the at least one tab sheet to at least one predetermined position of one copy of a printout comprising N recording sheets, the printing apparatus comprising:

a printing unit configured to output the printout;

a first determining unit configured to determine whether said printing unit outputs the printout from a first recording sheet or from an N-th recording sheet;

a second determining unit configured to determine whether the sheet storage unit stores the plurality of tab sheets in a first order for inserting the plurality of tab sheets in the printout output from the first recording sheet or in a second order for inserting the plurality of tab sheets in the printout output from the N-th recording sheet;

a control unit configured to:

permit said printing unit to output the printout from the N-th recording sheet in a case where said first determining unit determines that said printing unit outputs the printout from the N-th recording sheet and said second determining unit determines that the sheet storage unit stores the plurality of tab sheets in the second order; and control said printing unit to not output the printout in a case where said first determining unit determines that said printing unit outputs the printout from the N-th recording sheet and said second determining unit determines that the sheet storage unit stores the plurality of tab sheets in the first order.

9. A method of controlling a printing apparatus that feeds at least one tab sheet of a plurality of tab sheets from a sheet storage unit and inserts the at least one tab sheet to at least one predetermined position of one copy of a printout comprising N recording sheets, the method comprising:

an outputting step of outputting, with a printing unit, the printout;

a first determining step of determining whether said printing unit outputs the printout from a first recording sheet or from an N-th recording sheet;

a second determining step of determining whether the sheet storage unit stores the plurality of tab sheets in a first order for inserting the plurality of tab sheets in the printout output from the first recording sheet or in a second order for inserting the plurality of tab sheets in the printout output from the N-th recording sheet;

a control step of permitting said printing unit to output the printout from the N-th recording sheet in a case where the first determining step determines that said printing unit outputs the printout from the N-th recording sheet and the second determining step determines that the sheet storage unit stores the plurality of tab sheets in the second order; and a display control step of controlling a display unit to display an error message in a case where the first determining step determines that said printing unit outputs the printout from the N-th recording sheet and the second determining step determines that the sheet storage unit stores the plurality of tab sheets in the first order.

10. The method according to claim 9, the control step, in a case where the first determining step determines that the printing unit outputs the printout from the N-th recording sheet and the second determining step determines that the sheet storage unit stores the plurality of tab sheets in the second order, after at least one extra tab sheet is discharged, controls the printing unit to discharge the printout from the N-th recording sheet.

11. The method according to claim 10, wherein, in a case where the first determining step determines that the printout is output from the first recording sheet, the control step controls the printing unit to discharge the printout from the first recording sheet, and after the N-th recording sheet is discharged, controls to discharge the at least one extra tab sheet.

12. The method according to claim 10, wherein, in a case where the printout is to be discharged in a face-up state, the control step, after the at least one extra tab sheet is discharged, controls the printing unit to discharge the printout from the N-th recording sheet.

13. The method according to claim 10, wherein, in a case where the printout is to be discharged in a face-down state, the control step controls the printing unit to discharge the printout from the first recording sheet, and after the N-th recording sheet is discharged, controls the printing apparatus to discharge the at least one extra tab sheet.

14. The method according to claim 9, wherein the control step controls the printing apparatus to discharge the at least one extra tab sheet into a discharging section different from a discharging section where the printout is discharged.

15. The method according to claim 9, wherein the error message indicates that the sheet storage unit does not store the plurality of tab sheets in the second order for inserting the plurality of tab sheets in the printout output from the N-th recording sheet.

16. A method of controlling a printing apparatus that feeds at least one tab sheet of a plurality of tab sheets from a sheet storage unit and inserts the at least one tab sheet to at least one predetermined position of one copy of a printout comprising N recording sheets, the method comprising:

an outputting step of outputting, with a printing unit, the printout;

a first determining step of determining whether said printing unit outputs the printout from a first recording sheet or from an N-th recording sheet;

a second determining step of determining whether the sheet storage unit stores the plurality of tab sheets in a first order for inserting the plurality of tab sheets in the printout from the first recording sheet or in a second order for inserting the plurality of tab sheets in the printout output from the N-th recording sheet;

a first control step of permitting said printing unit to output the printout from the N-th recording sheet in a case where the first determining step determines that said printing unit outputs the printout from the N-th recording sheet and the second determining step determines that the sheet storage unit stores the plurality of tab sheets in the second order; and a second control step of controlling said printing unit to not output the printout, in a case where the first determining step determines that said printing unit outputs the printout from the N-th recording sheet and the second determining step determines that the sheet storage unit stores the plurality of tab sheets in the first order.

17. A non-transitory computer readable storage medium for storing a computer-readable program executable by a computer to execute a method of controlling a printing apparatus that feeds at least one tab sheet of a plurality of tab sheets from a sheet storage unit and inserts the at least one tab sheet to at least one predetermined position of a printout comprising N recording sheets, wherein the method comprises:

an outputting step of outputting, with a printing unit, the printout;

a first determining step of determining whether said printing unit outputs the printout from a first recording sheet or from an N-th recording sheet;

a second determining step of determining whether the sheet storage unit stores the plurality of tab sheets in a first order for inserting the plurality of tab sheets in the printout output from the first recording sheet or in a second order for inserting the plurality of tab sheets in the printout output from the N-th recording sheet; and a control step of permitting said printing unit to output the printout from the N-th recording sheet in a case where the first determining step determines that said printing unit outputs the printout from the N-th recording sheet and the second determining step determines that the sheet storage unit stores the plurality of tab sheets in the second order; and a display control step of controlling a display unit to display an error message, in a case where the first determining unit determines that said printing unit outputs the printout from the N-th recording sheet and the second determining step determines that the sheet storage unit stores the plurality of tab sheets in the first order.

* * * * *